United States Patent [19]
Jones et al.

[11] 4,066,826
[45] Jan. 3, 1978

[54] SODIUM SULPHUR CELLS

[75] Inventors: Ivor Wynn Jones; Graham Robinson; Thomas Lewis Bird, all of Chester, England

[73] Assignee: The Electricity Council, London, England

[21] Appl. No.: 721,625

[22] Filed: Sept. 8, 1976

Related U.S. Application Data

[62] Division of Ser. No. 550,072, Feb. 14, 1975, Pat. No. 3,982,957.

[51] Int. Cl.² ............................................. H01M 4/36
[52] U.S. Cl. ..................................... 429/104; 429/174
[58] Field of Search ................................. 429/101–104, 429/174

[56] References Cited

U.S. PATENT DOCUMENTS 3,883,367  5/1975  Chiku et al. .......................... 429/104

Primary Examiner—Charles F. LeFevour
Attorney, Agent, or Firm—Beveridge, DeGrandi, Kline & Lunsford

[57] ABSTRACT

In a sodium sulphur cell, the cathode current collector in the sulphur/polysulphide cathodic reactant comprises a carbon or graphite tube containing a solid metal, e.g. aluminum, core and a liquid metal, e.g. tin or a tin-lead alloy, as a conducting interface between the carbon or graphite tube and the core. In a preferred construction, the current collector is axially located within a cylindrical electrolyte tube, the space between the electrolyte tube and graphite tube containing the sulphur/polysulphides and a graphite felt. The outer surface of the graphite tube in this case may have grooves or recesses to form a sulphur reservoir.

9 Claims, 5 Drawing Figures

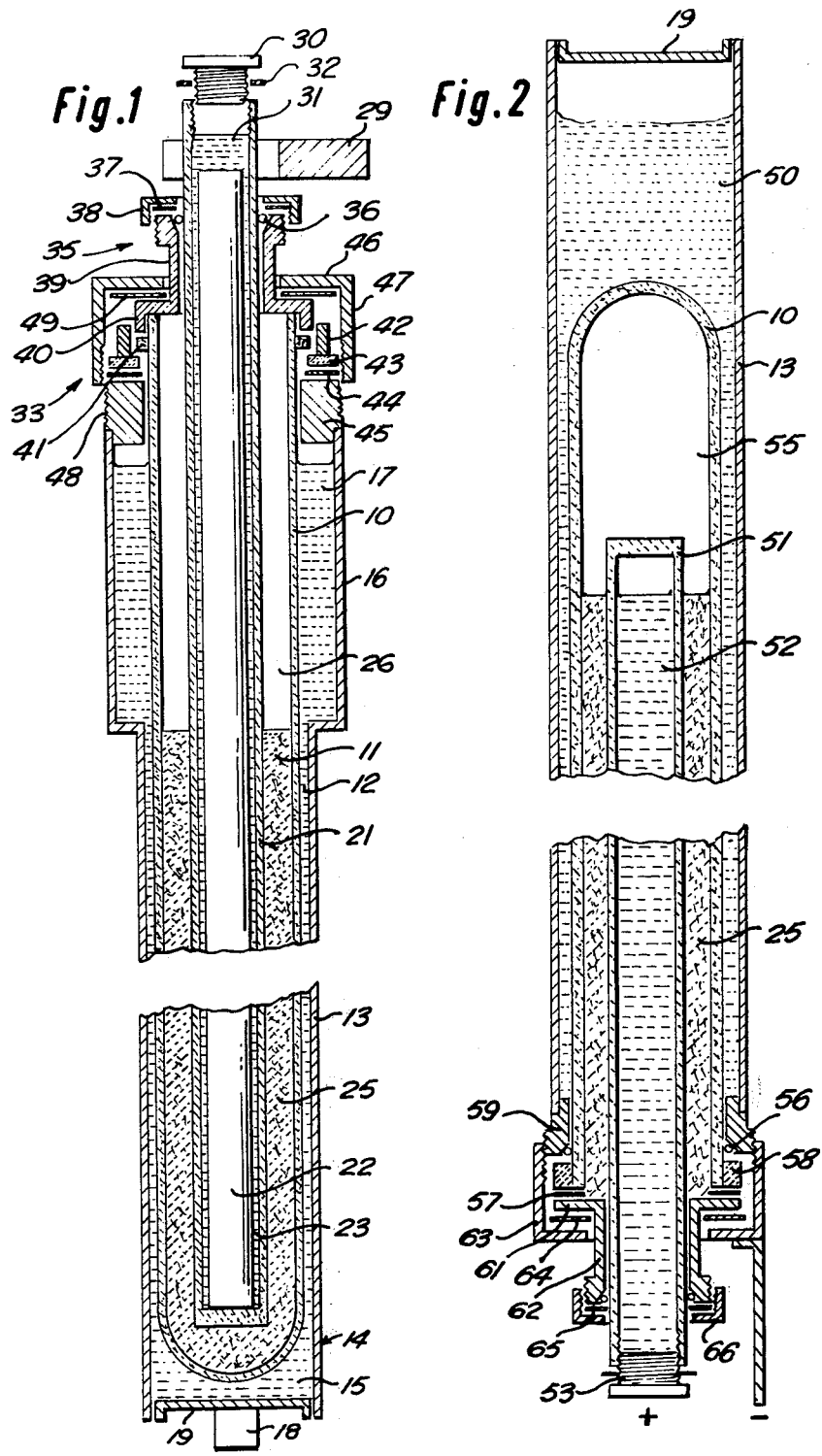

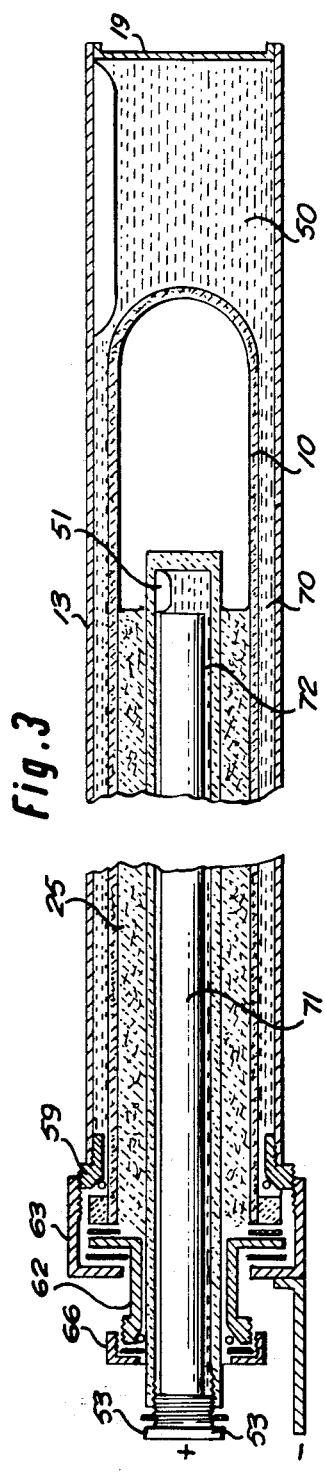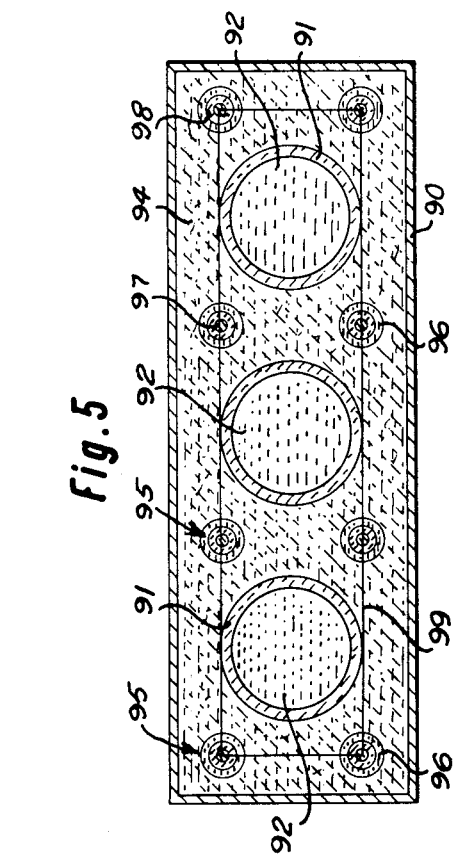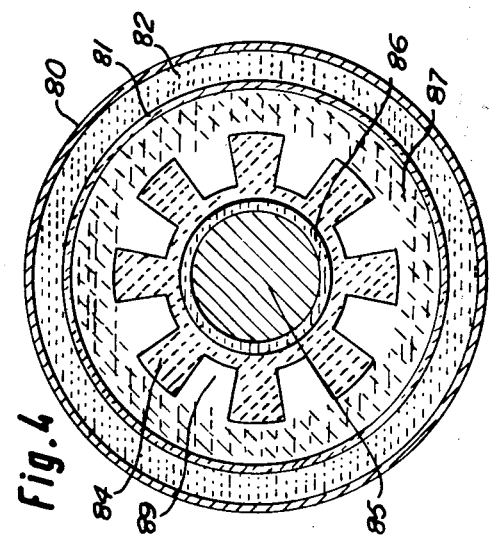

SODIUM SULPHUR CELLS

REFERENCES TO RELATED APPLICATIONS

This application is a division of our co-pending application Ser. No. 550,072 filed Feb. 14, 1975 now U.S. Pat. No. 3,982,957.

BACKGROUND OF THE INVENTION

1. Field of the invention

This invention relates to sodium-sulphur cells and is concerned more particularly with the construction of the cathode current collector.

2. Prior Art

Sodium-sulphur cells have a solid electrolyte of beta-alumina separating a liquid sodium metal anode from a liquid cathodic reactant which includes sulphur. This cathodic reactant has a composition which depends on the state of charge or discharge of the cell. As the cell discharges, sodium ions pass through the electrolyte into the cathodic reactant to combine with negatively charged sulphide ions to form sodium polysulphides; the cathodic reactant however is commonly referred to as the sulphur electrode. It is necessary to inject and extract electrons from the sulphur electrode and this is done by means of a porous conductive body, such as graphite or carbon felt matrix. The porous conductor acts as a large-area electrode surface at which electrons can be supplied to or removed from the sulphur or polysulphides during the cell reaction. As the electrical conductivity of such a porous material is low, a current collector has to be electrically connected to this matrix to enable an external circuit to be connected to the cathode of the cell.

The present invention is concerned more particularly with this cathode current collector. Under the electrochemical conditions prevailing in the sulphur electrode, even stainless steel is subject to corrosion. Heretofore however stainless steel has been considered to be the best material to employ. The corrosion of the steel has several deleterious effects. For example, sulphur which would otherwise be available for reaction in the cell is consumed in the formation of corrosion products. If the cell capacity is controlled by the sulphur, then such consumption of sulphur reduces the cell capacity.

BRIEF SUMMARY OF THE INVENTION

According to one aspect of this invention, in a sodium sulphur cell, there is provided a current collector in contact with the cathode reactant and formed of an impermeable carbon or graphite rod or tube containing a deformable electric conductor extending over and in contact with the internal surface of the tube. The deformable conductor may be a graphite felt or steel wool and, in this case, a conductive solid metal core is provided within the carbon or graphite tube, the deformable conductor forming a conductive interface between the inner surface of the graphite tube and the core. Most conveniently however the deformable conductor is a metal which is liquid at the operating temperature of the cell.

Thus the invention includes within its scope a sodium sulphur cell wherein a current collector in contact with the cathodic reactant is formed of an impermeable carbon or graphite rod or tube containing a metal which is liquid at the operating temperature of the cell. A conductive core for example a metal rod may be provided within the liquid metal, the core being of a metal which is solid at the operating temperature of the cell.

It will be seen that, by this construction, the only material in contact with the cathodic reactant is graphite. Carbon is not significantly attacked by sulphur or sodium polysulphides and this arrangement therefore greatly reduces or eliminates the corrosion problems. The carbon or graphite rod or tube is impermeable and thus the sulphur cannot penetrate it; the tube may conveniently be made impermeable by pyrolytic impregnation.

It will be seen that the cathode current collector described above is of a composite construction. The electrical conductivity of carbon is poor and a simple carbon rod could not be used as the cathode current collector as its high resistivity would impair the cell performance. By providing a conductive member in the graphite tube in the form of a liquid metal or a metal rod with a suitable interface between the rod and the tube, the internal surface of the carbon or graphite tube is connected directly to a low resistance electrical path of the cathode current of the cell. The current path through the graphite tube is therefore merely through the thickness of the tube and not along the length of the tube. The problem of the resistivity of carbon is thus overcome giving thereby a form of cathode collector having high conductivity and good corrosion resistance while permitting of easy manufacture.

It would not generally be possible, in the conditions of a sodium sulphur cell, to make use of a cathode current collector comprising a solid metal rod with a coating of carbon. During the heating and cooling operations involved in manufacturing, filling and operating a cell, the materials of such a composite may undergo different rates of thermal expansion and the resulting stresses will tend to cause any coating to separate from the substrate metal. The provision of the liquid metal or the other deformable interface overcomes these problems.

Liquid metal forms a particularly convenient interface between a solid core and the surface of the carbon or graphite tube ensuring a conductive path to the core from the whole surface of the tube which is in contact with the liquid metal. This liquid metal may be any suitable metal which is liquid at the operating temperature of the cell and which does not react with the graphite or a solid core. The operating temperature is typically about 350° C and would be within the range of 280° C to 400° C. There is a wide range of metals which are liquid at these temperatures, for example mercury, gallium, sodium, lithium, indium, potassium, tin and cadmium and alloys and amalgams between these and/or other metals. The core may be made of a convenient metal of good electrical conductivity. With an aluminium core, it is preferred to use a soft solder (a tin lead alloy) for the liquid metal. If a solid metal core is omitted, the preferred liquid metal is tin.

The external electric connection to the current collector may be made by means of a clamp connector around the carbon or graphite tube or by means of a connection to the core or liquid metal within the tube, for example through an end plug for sealing the carbon or graphite tube.

The composite electrode must have a sheath which is impervious to penetration by sulphur or polysulphides so that the core is not chemically or electrochemically attacked. The graphite sheath may also be rendered impervious by filling the open pores with a resin or metal or any material that is solid at the operating temperature of the cell. The filler material need not be electrically conducting although it may be. However the integrity of such a tube is governed by the relative thermal expansion coefficients of the constituent materials. It is preferred therefore to make the carbon or graphite sheath impervious by filling the pores with a deposit of pyrolytic carbon or graphite. The pyrolytic deposit may be produced by filling the pores with a resin and then heating the tube to carbonise the resin or by heating the tube in a gaseous hydrocarbon atmosphere. Such techniques for making graphite impervious are in themselves wellknown and will not be further described.

The cell is conveniently a tubular cell with an electrolyte tube around and concentric with the cathode current collector, the sulphur electrode being in the annular region between the electrolyte and the cathode current collector and the sodium electrode being in an annular region outside the electrolyte and within an outer housing, which housing is typically made of stainless steel and may form the anode current collector. The above-described cathode current collector however may be used in other cell constructions; for example a cell might contain one or more electrolyte tubes with the sodium electrode within the electrolyte tube or tubes, and with the sulphur electrode outside the electrolyte tubes; in this case one or more cathode current collectors as described above may be provided, each comprising a carbon or graphite tube containing a liquid metal or containing a solid metallic core with an interface of liquid metal or other deformable material between the core and tube, these cathode current collectors being disposed around the or each electrolyte tube.

During discharge of the sodium sulphur cell there is a transfer of sodium ions from the sodium electrode through the solid electrolyte to the sulphur electrode where sodium polysulphides are formed. The volume of material in the sulphur electrode therefore increases during discharge of the cell. When the cell is fully charged it is therefore necessary that the sulphur electrode is only partly filled with sulphur; typically it is about two thirds full. The cell has to have provision for accommodating the increased volume of the cathodic reactant and, in a tubular cell, this may be done by providing a sulphur reservoir at one end of the cell. As previously explained, because of the relatively low electrical conductivity of the sulphur material, it is a known practice in sodium sulphur cells to put a porous conductive body, for example a graphite felt, in the sulphur between the electrolyte and the cathode current collector. To minimise the resistance of the cell the path length through the sulphur from the electrolyte to the current collector has to be kept small. The porous material also influences the cell operation by controlling the flow of liquid sulphur and sulphides and, as a capillary medium, it can influence the location of these reactants in the electrode. This is particularly important during cell recharge when sodium sulphide must maintain contact with the electrolyte despite an increasing predominance of sulphur content and voidage in the electrode material. The conflicting requirements lead to a compromise. Typically, in a tubular cell, the volume of porous material accomodates only the initial charge of sulphur, leaving the expansion space free. More efficient discharge would be aided by a large felt volume but better mass flow on recharge would be aided by a small felt volume.

Using the cathode current collector of the present invention having an impermeable carbon or graphite rod or tube, the cathode current collector being located inside an electrolyte tube, the external surface of the carbon or graphite rod or tube may be provided with grooves or recesses. Typically these grooves or recesses cover about a third to one half of the surface of the tube. They should have a width such as to allow free access of liquids into and out of the graphite felt provided in a known way between the current collector and the electrolyte surface; the width of the grooves or recesses however is made small enough to ensure that no parts of the electrolyte are too remote from the current collector for effective use. Typically grooves with a width of about 2 mm are employed. The maximum width is comparable with the felt thickness that is to say the spacing between the electrolyte tube and the current collector. It will be seen that with this arrangement, these grooves provide a space to receive the increased volume of sulphide material on discharge of the cell. However, even when the cell is fully charged, the inner surface of the electrolyte tube is always sufficiently close to an ungrooved portion of the carbon or graphite rod or tube of the current collector to give effective use of the whole surface area of the electrolyte. As the cell discharges, the sulphur material fills the grooves or recesses; by this construction it is thus possible to reduce the size of or elminiate any need for a sulphur reservoir at one end of the cell.

The grooves conveniently are longitudinal if the graphite tube is made by extrusion. With moulded tubes, other patterns, e.g. circumferential or helical or a criss-cross pattern, are readily possible.

The carbon or graphite felt in the sulphur can be attached mechanically or bonded to the carbon or graphite tube of the cathode current collector. Such bonding can be made with pyrolytic carbon or graphite before assembly of the cell; pyrolytic bonding can be carried out by preliminary adhesion with organic resins followed by carbonising treatment or by forming the carbon bond by pyrolysis of gaseous hydrocarbons. Furthermore, the porous felt itself may be incorporated as an uncarbonised precursor which is fired with the carbon or graphite tube of the current collector to form the composite electrode.

BRIEF DESCRIPTION OF THE DRAWINGS

FIGS. 1, 2 and 3 are each a longitudinal section through a sodium sulphur cell;

FIG. 4 is a cross-section of a modification of the cell of FIG. 1; and

FIG. 5 is a diagrammatic cross-section through a further construction of sodium sulphur cell.

DESCRIPTION OF THE PREFERRED EMBODIMENTS

Referring to FIG. 1 there is illustrated a sodium sulphur cell having a solid electrolyte tube 10 formed of beta alumina which electrolyte tube separates a sulphur electrode 11 on the inside of the from a sodium electrode 12 on the outside of the tube. The tube 10 is closed at its lower end and, in a typical construction, is 22 cm long and has an internal diameter of 2.2 cm. The thickness of the tube wall is from 1 to 2 mm. Beta alumina is a ceramic material containing alumina and sodium oxide and possibly small quantities of other materials such as magnesium oxide or lithium oxide. It permits of the passage of sodium ions and hence is used as a solid electrolyte to separate the sulphur and sodium electrodes in a sodium sulphur cell. The tube 10, in the construction shown in FIG. 1, is surrounded by a stainless steel housing 13 which is of cylindrical form. The lower part of the housing, as shown at 14, has an internal diameter about 1 to 3 mm greater than the external diameter of the tube 10. The narrow annular region between this portion of the housing and the tube 10 contains sodium which is molten during operation of the cell, the sodium 15 in this region constituting the sodium electrode. Above this narrow annular region, the steel housing has an increased diameter for a length of approximately 5 cm as shown at 16; this enlarged diameter portion contains sodium and forms a sodium reservoir 17. Electrical connection to the sodium electrode is effected by means of a terminal 18 on an end closure plate 19 closing the lower end of the steel housing 14. The tube 10 is located in the housing 13 by projections on the housing or by wire spot-welded thereto of by putting a porous wick material between the housing and the electrolyte tube.

Within the electrolyte tube 10 is the sulphur electrode and a cathode current collector extending into the sulphur. The current collector comprises a graphite tube 21 which is formed of graphite made impermeable by impregnation with pyrolytic carbon so as to make the tube material impervious to penetration by liquid. The graphite tube 21 is closed at its lower end and has an internal diameter diameter of about 8 to 10 mm in this particular example. Within the graphite tube is a solid metal rod 22 forming an electrically conductive core. This core may be made of an electrically conductive metal and, in this particular example is aluminium although other electrically conductive materials such as copper or iron might be employed. The metal rod 22 has a diameter about 1 mm less than the internal diameter of the tube so as to leave a narrow annular space within the tube 21. This space is filled with a metal 23 which is liquid in the temperature range of operation of the cell (about 280° to 400° C). The metal 23 in this annular region has to be liquid at these temperatures and can be any electrically conductive material which does not react with the graphite tube 21 or the metal rod 22. With an aluminium core, it is preferred to use soft solder (a tin lead alloy) 23 in the annular region.

The liquid metal 23 effects electrical contact between the internal surface of the graphite tube 21 and the metal rod 22; the rod 22 and metal 23 form a low resistance electrical path so reducing the electrical resistance to current flow along the length of the cathode current collector.

Between the outer surface of the graphite tube 21 and the inner surface of the electrolyte tube 10 is an annular region containing the sulphur and sulphur and sulphide materials forming the cathode of the cell. The greater part of this region contains a loose packing of graphite felt 25 or similar material to increase the conductivity of the sulphur/sulphide material forming the electrode. The top part of the annular region between the electrolyte and cathode current collector at 26 is shown in the drawing without any sulphide material. This region forms the sulphur/sulphide reservoir. As the cell is discharged, sodium passes through the electrolyte tube 10 to form sodium polysulphides in the region hence increasing the volume of material forming the cathode. The region 26 serves to accommodate this increased volume of cathodic material as the cell discharges.

Current to and from the cathode passes through the cathode collector constituted by the graphite tube 21 with its core 22 and the liquid metal 23. An electrical terminal 29 is clamped to the outside of the graphite tube. Alternatively a plug 30 forming a top closure for this tube may be electrically connected to the core rod 22 and used as the positive terminal. In the embodiment shown, however, the cathode terminal 29 is clamped to the outside of the graphite tube 21 and the space above the top of the core rod forms a reservoir 31 which is partly filled with the liquid metal 23 and allows for thermal expansion of the liquid metal and of the core when the cell is heated to the operating temperature. The plug 30 is threaded into the top of the graphite tube 21 to form a closure with a gasket 32 to ensure a tight seal.

A seal 35 isolates the sulphur electrode from the external atmosphere when the current collector emerges from the sulphur electrode. This seal comprises an O-ring 36 of elastomeric material and metal packing 37 held in place by a threaded member 38 which engages the threads on an annular element 39 extending across the top of the sulphur region. The element 39 has a downwardly dependent flange 40 extending around the top end of the electrolyte tube 10 and engaging an annular seal 41 which forms a seal between the sodium and sulphur electrodes and between the two electrodes and external atmosphere. The annular seal 41 lies within an annular metal element 42 and is compressed between the bottom of the flange 40 and the upper surface of an insulating washer 43, which washer seats on a flat sealing gasket 44 on the upper surface of an inwardly-directed rim 45 around the top of the housing 13. The insulating washer 43 is required in this embodiment because graphite is used for the packing 41; since graphite is an electrical conductor, the seal has to incorporate an insulator constituted by member 43 as well as the further sealing gasket 44. The seal is held in position by a cap 46 which has a flange 47 engaging an external thread 48 in the rim 45. A mica washer 49 insulates the cap from member 38. It will be noted that the seal is not contacted by the liquid cell reactants or reaction products in this construction so long as the cell is in the upright position illustrated.

The cell of FIG. 1 is arranged for use in the upright position shown. FIG. 2 illustrates a modification of the cell for use in an inverted position. In FIG. 2, the same reference numerals are used as in FIG. 1 to illustrate corresponding components and reference will be made only to the distinctive features of FIG. 2.

In FIG. 2 a sodium reservoir 50 is provided in the housing 13 at the upper closed end of the electrolyte tube and the space around the electrolyte tube is kept filled with sodium by gravity as well as by capillary attraction. The cathode current collector in FIG. 2 comprises an impermeable graphite tube 51 closed at its upper end, the carbon tube being filled with a liquid metal 52, e.g. tin or soft solder. In FIG. 2 no solid core is illustrated although such a core may be used. With the inverted position, the liquid metal remains in contact with a metal closure plug 53 closing the end of the graphite tube 51 and this closure plug 53 is used as the cathode terminal for the cell. The cathode current collector does not extend into the sulphur/sulphide reservoir which is constituted by a region 55 between the closed ends of the graphite tube 51 and electrolyte tube 10.

The seal between the sodium and sulphur electrodes and between the electrodes and the external atmosphere is different in FIG. 2 compared with that of FIG. 1. In the arrangement of FIG. 2, two packing members 56, 57 both form seals against the electrolyte tube 10 so that neither packing member is in contact with both cell reactants. This prevents any electrochemical attack on the sealing material when the cell is operated in the position shown. The packing member 56 is of elastomeric material or graphite around the electrolyte tube and pressed between an electrically insulating washer 58 of ceramic material and a rim member 59 on the bottom end of the housing 13. Below the ring 58 is the second packing member 57 formed by a sealing gasket held in position by a flange 61 on the upper end of an element 62. The element 62 is secured in position by a cap 63 which is threaded to screw onto rim member 59, a further insulating washer 61 being provided between the cap 63 and the element 62. This element 62 serves as a support for an O-ring elastomeric seal around the graphite tube 21, which seal is compressed by a metal washer 65 secured by a threaded cap 66.

FIG. 3 illustrates a modification of the arrangement of FIG. 2 to enable the cell to be used in a horizontal position. In FIG. 3 the same reference numerals are used as in FIG. 2 and reference will be made only to the modifications. In FIG. 3, the annular space 70 between the electrolyte tube 10 and the outer housing 13 must be a capillary region so that the sodium is attracted into this region from the sodium reservoir 50 at the end of the housing 13 thereby maintaining the whole of the outside of the electrolyte tube 10 wetted with the sodium despite the gradual decrease in the amount of the sodium in the reservoir 50 as the cell discharges. The cathode current collector in this arrangement includes a solid metal rod, for example an aluminium rode 71, within the graphite tube 51 and separated therefrom by a narrow annular region 72 forming a capillary region into which the liquid metal is attracted so that the rod 71 is effectively electrically connected to the graphite tube 51 over substantially the whole length thereof improving the conductivity thereof. The metal in the region 72 is chosen as a metal which is liquid at the operating temperature of the cell and is not chemically reactive at this temperature with either the graphite of tube 51 or the metal of the rod 71. For an aluminum rod, soft solder is conveniently employed as the liquid metal.

Another modification of the cell of FIG. 1 is illustrated in FIG. 4 which is a cross-section through a cell showing an outer steel housing 80 which surrounds an electrolyte tube 81 leaving a capillary region 82 between the housing and the electrolyte tube for the sodium electrode. Within the electrolyte tube is a cathode current collector comprising a hollow impermeable graphite tube 84 containing an inner solid metal rode 85, conveniently formed of aluminium. As in the constructions of FIGS. 1 and 3, the space between the rod 85 and the inner surface of the graphite tube 84 is filled with a liquid metal 86 for example a soft solder.

The space between the electrolyte and the graphite member is filled with a graphite felt 87 to increase the conductivity of the sulphur/sulphide material forming the cathode electrode. Typically this is a graphite felt of density about 0.1 gms per cc.

In the construction shown in FIG. 4, longitudinal grooves 89 are formed in the outer surface of the graphite tube 84. These grooves which typically have a width and depth of the order of 2 to 5 mm, acts as an expansion volume to accommodate the extra volume of sulphide material formed as the cell discharges. The width of the grooves 89 is such that all the electrolyte surface area can be used effectively, that is to say the grooves are sufficiently numerous that no region of the inner surface of the electrolyte tube 81 is too remote from an ungrooved portion of the graphite tube 84 of the cathode current collector. When the cell is fully charged, the outer periphery of the graphite tube 84 between the grooves 89 is in contact with the graphite felt 87 and with the sulphur electrode material so that the current can flow through the graphite felt between the electrolyte tube 81 and the tube 84. As the cell discharges, the sulphide material gradually fills up the grooves 89. These grooves thus serve to accommodate the extra sulphide material formed in the electrochemical process whilst still permitting use of the whole of the electrolyte surface area. Using this construction of cathode current collector it is possible to omit the sulphur/sulphide reservoir 26 of FIG. 1 or the sulphur/sulphide reservoir 55 of FIGS. 2 and 3 and hence the cell becomes more compact for a given power output.

The graphite felt between the electrolye tube and graphite tube is in contact with the outer surface of the teeth or projections on the graphite tube and with the inner surface of the electrolyte tube, preferably with the whole periphery of electrolyte tube. It need not fill the whole annular region outside the outermost part of the projections on the graphite tube and preferably shaped graphite felt is employed filling between 5% and 60% of this region.

Although in FIG. 4 longitudinal grooves 89 are shown, they may take other forms. If the graphite tube is extruded, longitudinal grooves are convenient. For a moulded tube however it may be found more convenient to have a circumferential grooves. Helical grooves or grooves in a crossing pattern are other fiorms which may be employed. The grooves need not be uniformly distributed over the surface of the graphite tube but can be more frequent towards one end or one side of the tube to allow for gravitational effects associated with the cell orientation or for electrical non-uniformity associated with the finite resistivity of the current collector. The grooves may be empty or may be packed with fibres of an electrical conductor or insulator, e.g. alumina fibres, which serve as capillaries to assist transport of the cathodic reactant.

Although in the embodiments described above, the cathode current collector has been arranged inside the electrolyte tube, other arrangements are possible. FIG. 5 illustrates diagrammatically a cross section through a cell system having, within an outer casing 90, a number of electrolyte tubes 91 formed of beta alumina ceramic material. The sodium 92 is arranged within the electrolyte tubes with a suitable current collector (not shown) conveniently at one end of the tube. The electrolyte tubes are surrounded by the sulphur/polysulphide electrode material with a graphite felt packing 94 between the electrolyte tubes and the housing. Within this sulphur electrode are a number of cathode current collectors 95 each formed of a graphite tube 96 which is impervious to liquids, each tube containing a solid metal core 97 for example an aluminium rod with a liquid metal 98, for example a soft solder, forming an interface material between the solid core and the graphite tube. These cathode current collectors are disposed around the various electrolyte tubes and are electrically connected in parallel as indicated diagrammatically at 99.

As in the previously-described arrangements, the solid core with the liquid metal interface within the graphite tubes enables cathode current collectors of low electrical resistivity to be provided which cathode current collectors however have a graphite surface exposed to the sulphur/sulphide material so as to give the advantages of the higher resistance to electrochemical attack provided by graphite compared with stainless steel cathode current collectors.

We claim:

1. In a sodium sulphur cell having a cathodic compartment and an anodic compartment separated by a solid electrolyte, a rigid cathode current collector in the cathodic compartment, which current collector has an external surface of carbon or graphite, the cathodic compartment containing a carbon or graphite matrix impregnated with a sulphur/polysulphide cathodic reactant extending between the current collectors and the electrolyte; the improvement in which said current collector is formed as an impermeable rod or tube containing a conductor effectively electrically connected thereto over substantially the whole length thereof and having, in its external surface, grooves or recesses into which the matrix material does not extend, said grooves or recesses thereby forming reservoirs for the cathodic reactant.

2. A sodium sulphur cell comprising a housing, a tubular solid electrolyte within said housing, a sodium electrode sealed in an annular region around said electrolyte tube, a cathodic reactant comprising sulphur/polysulphides within said electrolyte tube and a rigid cathode current collector located axially within the tubular electrolyte, which current collector is an impermeable rod or tube containing a conductor effectively electrically connected thereto over substantially the whole length thereof and has at least an external surface formed of carbon or graphite, the annular region between the cathode current collector and the electrolyte containing a matrix of electronically conductive material impregnated with said cathodic reactant and extending between the electrolyte and said current collector, wherein the current collector has grooves or recesses on its external surface into which the matrix material does not extend, said grooves or recesses thereby forming reservoirs for the cathodic reactant.

3. A sodium sulphur cell as claimed in claim 2 wherein the grooves or recesses have a width less than the spacing of the electrolyte tube from the outer surface of the current collector.

4. A sodium sulphur cell as claimed in claim 2 wherein the apparent volume of the matrix material is not more than 60% and not less than 5% of the annular space between the outer surface of the current collector and the inner surface of the electrolyte tube.

5. A sodium sulphur cell as claimed in claim 2 wherein the grooves are longitudinal.

6. A sodium sulphur cell as claimed in claim 2 wherein the grooves or recesses are packed with a capillary material.

7. A sodium sulphur cell as claimed in claim 2 wherein the cathode current collector comprises a rod or tube of carbon or graphite rendered impervious by pyrolytic impregnation.

8. A sodium sulphur cell as claimed in claim 2 wherein said grooves or recesses comprise grooves having a width and depth of the order of 2 to 5 mm.

9. A sodium sulphur cell comprising an outer housing of generally tubular form closed at one end, an electrolyte tube of solid beta-alumina ceramic closed at one end and axially located within the housing, sodium in the annular region between the electrolyte tube and the housing, a cathode current collector extending axially in the electrolyte tube, which cathode current collector comprises an impermeable carbon or graphite tube containing a conductor effectively electrically connected thereto over substantially the whole length thereof and having grooves or recesses in its outer surface, a porous carbon or graphite felt extending between the electrolyte tube and the cathode current collector but not into said grooves or recesses, a cathodic reactant material including sulphur impregnating said felt, and sealing means sealing the housing to the electrolyte tube to seal the sodium-containing region and sealing the electrolyte tube to the carbon or graphite tube to seal the sulphur-containing region.

* * * * *